(12) United States Patent
Finn et al.

(10) Patent No.: US 9,145,838 B2
(45) Date of Patent: Sep. 29, 2015

(54) APPARATUS AND METHOD FOR CONTROLLING A MULTI-FUEL ENGINE

(75) Inventors: Paul Howard Finn, Yorkshire (GB); Gregory Douglas Horler, Yorkshire (GB)

(73) Assignee: Intelligent Diesel Systems Ltd., Bradford, Yorkshire (GB)

( * ) Notice: Subject to any disclaimer, the term of this patent is extended or adjusted under 35 U.S.C. 154(b) by 975 days.

(21) Appl. No.: 13/318,298

(22) PCT Filed: Apr. 30, 2010

(86) PCT No.: PCT/GB2010/050718
§ 371 (c)(1),
(2), (4) Date: Feb. 20, 2012

(87) PCT Pub. No.: WO2010/125396
PCT Pub. Date: Nov. 4, 2010

(65) Prior Publication Data
US 2012/0226426 A1 Sep. 6, 2012

(30) Foreign Application Priority Data
May 1, 2009 (GB) .................................. 0907614.2

(51) Int. Cl.
| F02D 19/10 | (2006.01) |
| F02B 7/08 | (2006.01) |
| F02D 19/06 | (2006.01) |
| F02D 19/08 | (2006.01) |
| F02D 41/00 | (2006.01) |

(52) U.S. Cl.
CPC . *F02D 19/10* (2013.01); *F02B 7/08* (2013.01); *F02D 19/061* (2013.01); *F02D 19/0647* (2013.01); *F02D 19/0692* (2013.01); *F02D 19/081* (2013.01); *F02D 41/0027* (2013.01); *F02B 2201/064* (2013.01); *F02D 2400/11* (2013.01); *Y02T 10/36* (2013.01)

(58) Field of Classification Search
CPC ......... F02D 19/10; F02D 19/105; F02B 7/06; F02B 7/08
USPC ....... 701/103–105; 123/27 GE, 525, 526, 575
See application file for complete search history.

(56) References Cited

U.S. PATENT DOCUMENTS

| 4,463,734 | A |   | 8/1984 | Akeroyd |
| 4,817,568 | A |   | 4/1989 | Bedford |
| 5,224,457 | A | * | 7/1993 | Arsenault et al. ............. 123/526 |
| 5,408,957 | A | * | 4/1995 | Crowley ................... 123/27 GE |
| 5,450,829 | A |   | 9/1995 | Beck |
| 5,890,459 | A | * | 4/1999 | Hedrick et al. ........... 123/27 GE |
| 6,073,592 | A |   | 6/2000 | Brown |
| 6,202,601 | B1 | * | 3/2001 | Ouellette et al. .......... 123/27 GE |

(Continued)

FOREIGN PATENT DOCUMENTS

WO    WO2004/029438    4/2004

*Primary Examiner* — Erick Solis
(74) *Attorney, Agent, or Firm* — Gable Gotwals

(57) ABSTRACT

A dual-fuel engine has a primary fuel supply and a secondary fuel supply, the primary and secondary fuels being arranged in use to mix with each other and with air for combustion in one or more cylinders of the engine. The supply of both the primary and secondary fuels is arranged to be actively managed in accordance with a desired engine performance characteristic by an electronic controller. In one arrangement the supply of a primary fuel is arranged to be actively reduced when a secondary fuel is supplied to the engine.

16 Claims, 10 Drawing Sheets

(56) References Cited

U.S. PATENT DOCUMENTS

| | | | |
|---|---|---|---|
| 6,230,683 B1* | 5/2001 | zur Loye et al. | 123/435 |
| 6,901,889 B1* | 6/2005 | Ritter et al. | 123/27 GE |
| 7,000,596 B2* | 2/2006 | Zurloye et al. | 123/435 |
| 7,444,986 B2 | 11/2008 | Shute | |
| 8,893,687 B2* | 11/2014 | Gingrich et al. | 123/568.11 |
| 2002/0007816 A1 | 1/2002 | Zur Loye | |
| 2003/0024246 A1 | 2/2003 | Beck | |
| 2004/0256495 A1* | 12/2004 | Baker et al. | 239/533.2 |
| 2005/0028791 A1 | 2/2005 | Niimi | |
| 2005/0121005 A1* | 6/2005 | Edwards | 123/525 |
| 2006/0064227 A1* | 3/2006 | Uhde et al. | 701/104 |
| 2007/0157912 A1* | 7/2007 | Ritter et al. | 123/679 |
| 2010/0288240 A1* | 11/2010 | Johnston et al. | 123/515 |
| 2012/0253641 A1* | 10/2012 | Warner et al. | 701/104 |

* cited by examiner

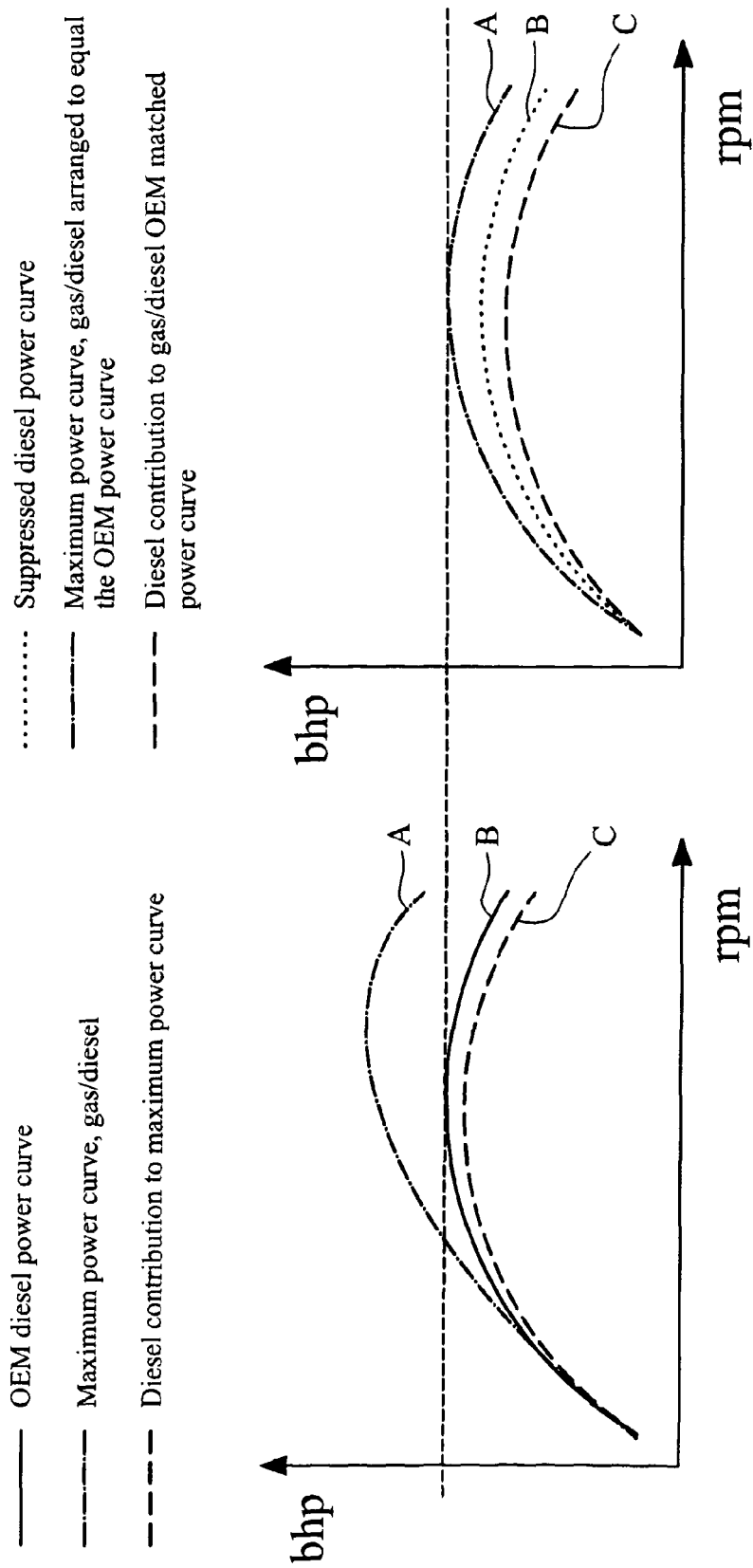

APPARATUS AND METHOD FOR CONTROLLING A MULTI-FUEL ENGINE

CROSS-REFERENCE TO RELATED APPLICATIONS

This application is the United States National Phase of PCT Patent Application No. GB2010/050718 filed on 30 Apr. 2010, which claims priority to British Patent Application No. 0907614.2 filed 1 May 2009, both of which are incorporated herein by reference.

BACKGROUND OF THE INVENTION

The present invention relates to the control of multi-fuel engines and is concerned particularly, although not exclusively, with apparatus and a method for controlling a dual fuel engine, such as a diesel/gas engine.

Multi-fuel engines, i.e. engines which use more than one type of fuel, have been known for many years. One successful type of multi-fuel engine is the dual fuel engine which uses diesel oil as a base, or primary fuel, and either liquid petroleum gas (LPG), compressed natural gas (CNG) or liquefied natural gas (LNG) as an alternative or secondary fuel. Secondary fuels are often attractive because of their low cost compared to diesel oil. Some such engines, such as that described in GB 2372835 B use diesel oil and LPG as alternatives, i.e. one fuel or the other is used, with some provision for switching between the two.

Other previously considered engines, such as the example described in EP 03712309, utilise the combination of diesel and gas, which are combusted together in the engine. Combusting the two fuels together has a number of advantages when compared to the use of diesel alone. Firstly, the amount of diesel used for an equivalent engine performance can be considerably less. Additionally, a more complete combustion of the fuel can be achieved which can result in a reduction of particulates in the exhaust emission. More power, per cylinder explosion, can also be achieved.

Generally with previously considered "combination type" dual fuel engines the aim has been to reduce the amount of diesel (i.e. primary fuel) burned by the engine without losing performance. When gas (i.e. secondary fuel) is introduced into the fuel mixture burned in the cylinder the mixture burns more completely than a charge of diesel oil alone, which results in a reduction of oxygen in the exhaust gases. The reduction in oxygen content can be detected, using a lambda probe, by the engine control unit (ECU) installed by the engine manufacturer which determines that the fuel/air mixture is too rich, and accordingly reduces the amount of primary fuel which is injected.

The outcome is a reduction in primary fuel consumption, as well as lower particulates.

Thus far, dual fuel engines of the kind described above have resulted from converting single fuel engines. Conversion comes at a price, but generally it can be seen that if the cost of the secondary fuel is lower than that of the primary fuel there is the potential for economic benefit. There is also the potential for environmental benefit and performance improvements.

FIG. 1 of the accompanying drawings shows schematically an example of a previously considered control system for a dual fuel engine. This example is similar to the one described in the above-mentioned EP 03712309.

The engine, represented by 10, is a four-cylinder diesel engine, which has been converted to run on a combination of diesel and LPG. Diesel, the primary fuel, is supplied from a tank 12 by a fuel pump 14 to each cylinder into which it is injected using conventional diesel injectors. The rate of flow of the diesel fuel can be measured by a flow meter 16 and the pressure in the diesel line can be monitored by a pressure monitor 18. Air, for use in combusting the fuel, is drawn from an air intake valve 20. A gas tank 22 holds LPG for use as a secondary fuel. The gas, in liquid state, passes through a gas supply valve 24 to a vaporiser 26 where it is changed to a gaseous state before being directed to four gas injectors 28a, 28b, 28c and 28d, one for each cylinder, which are arranged to deliver the gas to a location in the air inlet manifold in a region adjacent to the air inlet valve (not shown) of each cylinder, so as to mix with the air there.

The quantity of gas delivered to the cylinders is controlled by a gas control valve 30.

An electronic controller 32 controls the gas supply valve 24 and the gas control valve 30. The controller 32 takes signals from a throttle position sensor 34, a manifold pressure sensor 36, a knock sensor 38, a crank sensor 40 (for r.p.m. information), a thermometer 42 for detecting the vaporiser temperature, and a lambda sensor 44 (for exhaust oxygen-content). An RS232 interface 46 is provided on the controller 32 to enable connection to a computer (not shown) for set up, system monitoring and diagnostics.

All of the sensors 34, 36, 38, 40, 42 and 44 are dedicated devices which are installed in the engine during the conversion process, as are the controller 32, gas injectors 28-28d, tank 22 and vaporiser 26.

Gas is supplied to the cylinders already mixed with air. The quantity of gas supplied is determined according to various factors that include the throttle position and the engine r.p.m. During the induction stroke, the gas and air mixture is drawn into the cylinder and towards the end of the compression stroke the oxygen and diesel ignite causing the gas to burn which in turn more fully and more aggressively combusts the diesel fuel, producing a greater power stroke. The combustion products which are eliminated in the exhaust stroke show reduced oxygen and particulates as compared with the combustion of diesel alone.

The above conversion can be expensive and time-consuming not least because of the number of devices which must be installed.

SUMMARY OF THE INVENTION

According to one aspect of the present invention there is provided a dual fuel engine comprising a primary fuel supply and a secondary fuel supply, the primary and secondary fuels being arranged in use to mix with each other and with air for combustion in one or more cylinders of the engine, wherein the supply of both the primary and secondary fuels is arranged to be actively managed.

The supply of the primary and secondary fuels may be managed in accordance with a desired engine performance characteristic.

Management is preferably effected by an electronic controller.

The supply of both primary and secondary fuels may be arranged to be actively managed in accordance with a desired economy of performance of the engine.

In a preferred arrangement the supply of a primary fuel is arranged to be actively reduced when a secondary fuel is supplied to the engine.

The supply of primary fuel to the engine may be actively reduced by at least one of: controlling the injection timing of the primary fuel and/or controlling its pressure, and/or controlling the throttle.

Preferably the supply of a primary fuel comprising diesel fuel is arranged to be actively reduced when a secondary fuel comprising at least one of LPG, CNG and LNG is supplied to the engine.

The electronic controller may be, or may be included in, a dedicated ECU for actively managing the supply of the primary and secondary fuels. The dedicated ECU may comprise an after-market fitted ECU. Alternatively or additionally the active management of both the primary and secondary fuels may be undertaken by an OEM ECU.

The invention also includes a method of improving the economy of a dual fuel engine, the method comprising actively managing the supply of both a primary fuel and a secondary fuel to the engine. The method may comprise actively reducing the supply of a primary fuel, such as diesel for example, when a secondary fuel, such as LPG, CNG or LNG for example is supplied. The method may comprise actively reducing the supply of the primary fuel by at least one of: controlling the injection timing of the primary fuel and/or controlling its pressure, and/or controlling the throttle.

According to another aspect of the present invention there is provided a dual fuel engine comprising a primary fuel supply and a secondary fuel supply, the primary and secondary fuels being arranged in use to mix with each other and with air for combustion in one or more cylinders of the engine, wherein both primary and secondary fuels are arranged to be injected into the or each cylinder.

One of the primary and secondary fuels may be injected in gaseous state into the cylinder through an open air inlet valve.

Preferred embodiments of the present invention will now be described by way of example only with reference to the accompanying diagrammatic drawings in which:

BRIEF DESCRIPTION OF THE DRAWINGS

FIG. 7 is a graph showing the power delivery of a gas/diesel engine without active control of the diesel supply;

FIG. 8 is a graph showing the power delivery of a gas/diesel engine with active control of the diesel supply;

DESCRIPTION OF THE INVENTION

Figure 1:
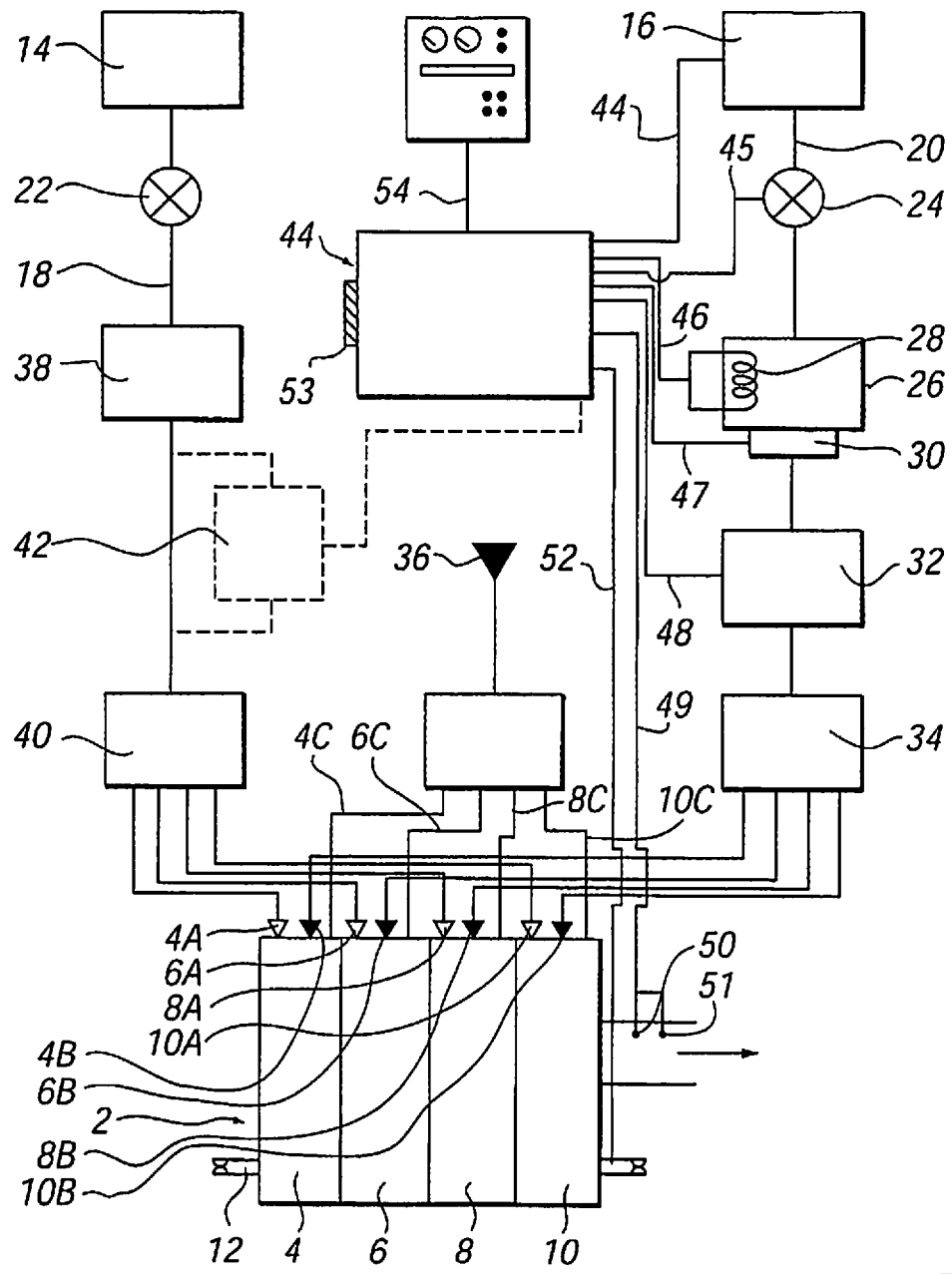
FIG. 1 shows schematically a previously considered control system for a dual fuel engine.
Figure 2:
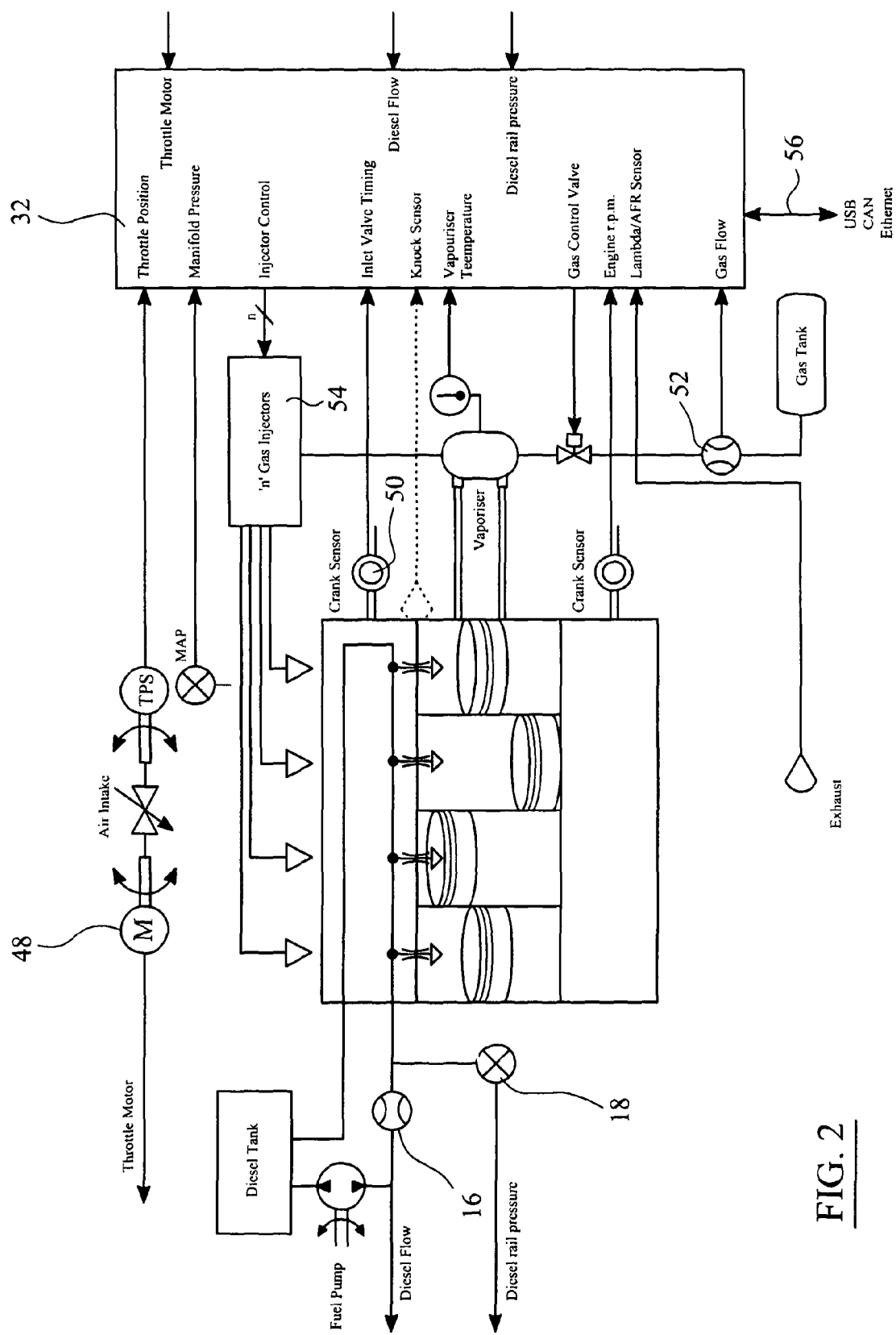
FIG. 2 shows schematically a control apparatus for a dual fuel engine according to an embodiment of the invention.

FIG. 2 shows schematically a control apparatus according to an embodiment of the present invention. The apparatus is similar to the previously considered one (described above) but utilises the number of additional sense signals, and applies further control signals to provide greater control over the dual fuel engine. Where possible the reference numerals from FIG. 1 are used for equivalent features in FIG. 2.

Specifically, the control unit 32 takes further signals from a throttle motor 48, the diesel flow meter 16, the diesel pressure monitor 18, a CAM sensor 50 and a gas flow meter 52.

The control unit 32 utilises these signals to control the dual fuel engine to operate more efficiently than was possible with previously considered systems.

The control unit 32 applies a control signal to a gas injector control module 54 which controls the four gas injectors 28a-28d so as to deliver gas in a quantity and at a timing determined by the control unit 32 based upon the measured parameters referred to above.

A multi interface port 56 is provided which allows the control unit 32 to connect to a computer via USB or Ethernet for set-up, monitoring or diagnostics.

The port 56 also allows the control unit 32 to connect to an ECU of the engine via a CAN bus as will be described below with reference to FIG. 3.

Figure 3:
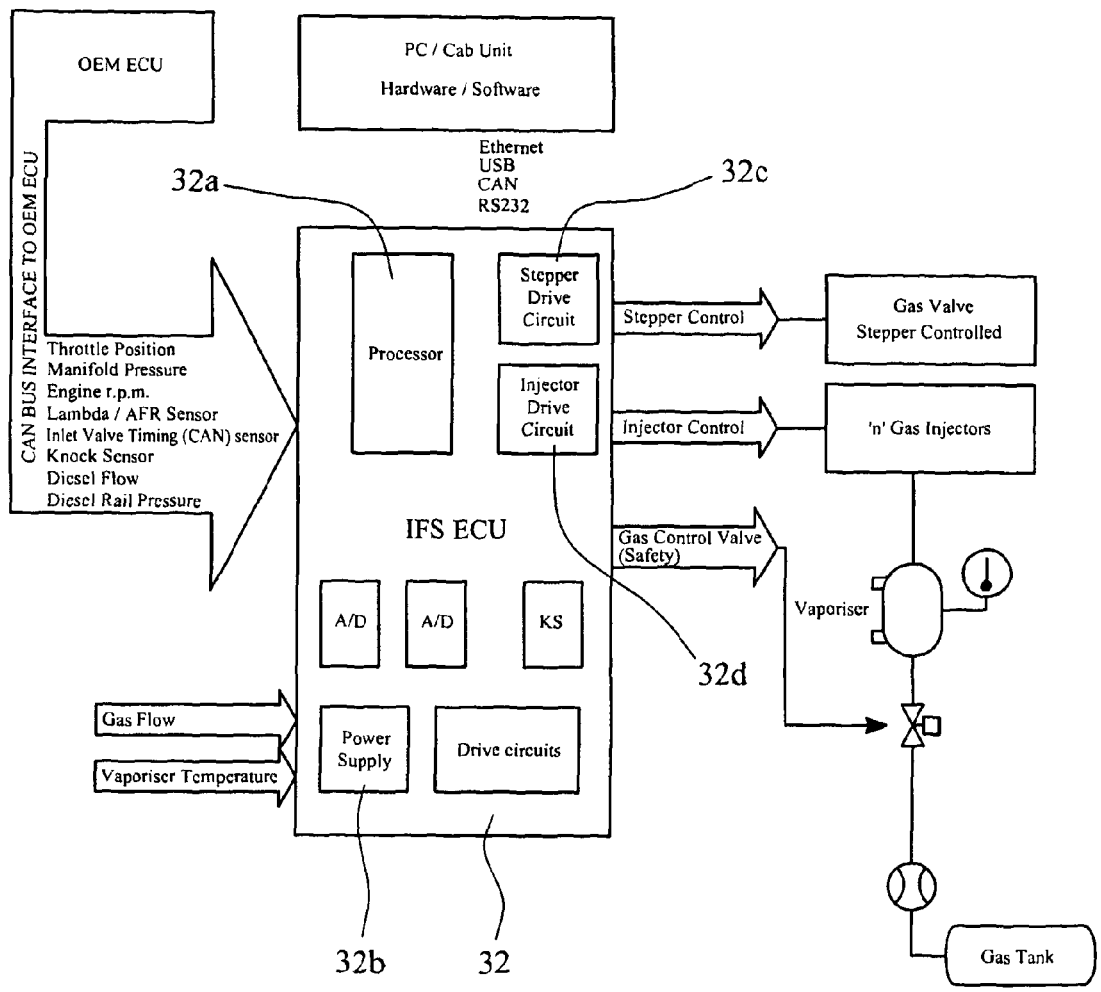
FIG. 3 shows schematically a further development of the control apparatus for a dual fuel engine according to the present invention.

FIG. 3 shows schematically the control unit 32 which includes a processor 32a and power supply 32b. In addition, the control unit comprises a stepper driver circuit 32a and an injector driver circuit 32d.

The control unit 32 derives senses signals from the ECU of the engine i.e. the original equipment manufacture (OEM) ECU including throttle position, manifold pressure, engine r.p.m., lambda probe (oxygen exhaust content), inlet valve timing, knock, diesel flow and diesel rail pressure. Conveniently the control unit 32 connects at its port 56 to a CAN bus of the OEM ECU.

By utilising these signals, which are already derived by the OEM ECU, the conversion process takes much less time and uses fewer components, which makes it less expensive.

In an alternative embodiment (not shown) the control unit 32 and OEM ECU can be combined in an integrated engine control unit for dual fuel control.

The system described above enables a greater degree of control of the delivery of the secondary fuel.

Figure 4:
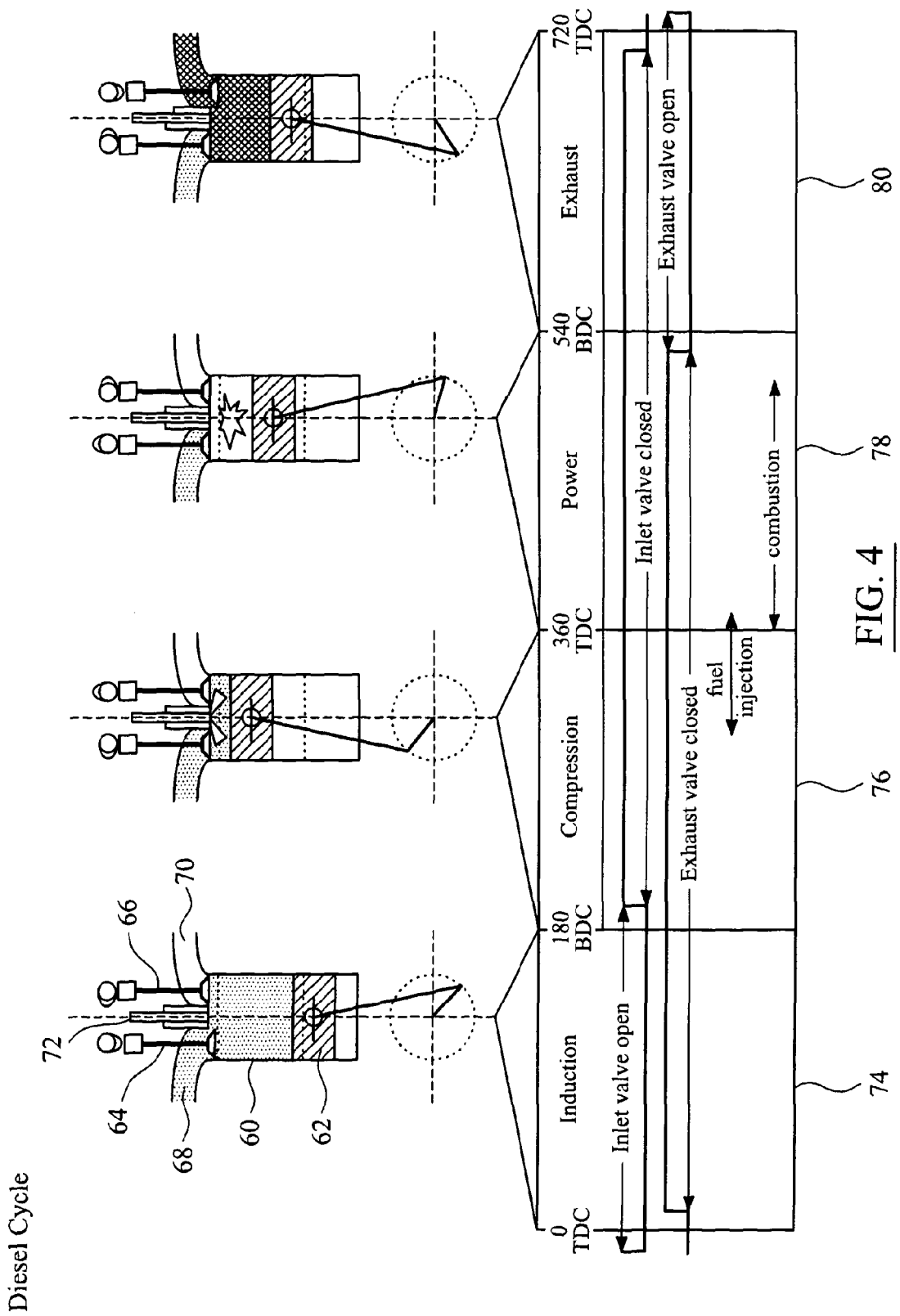
FIG. 4 is a timing diagram showing the combustion cycle of a diesel-only engine.
Figure 5:
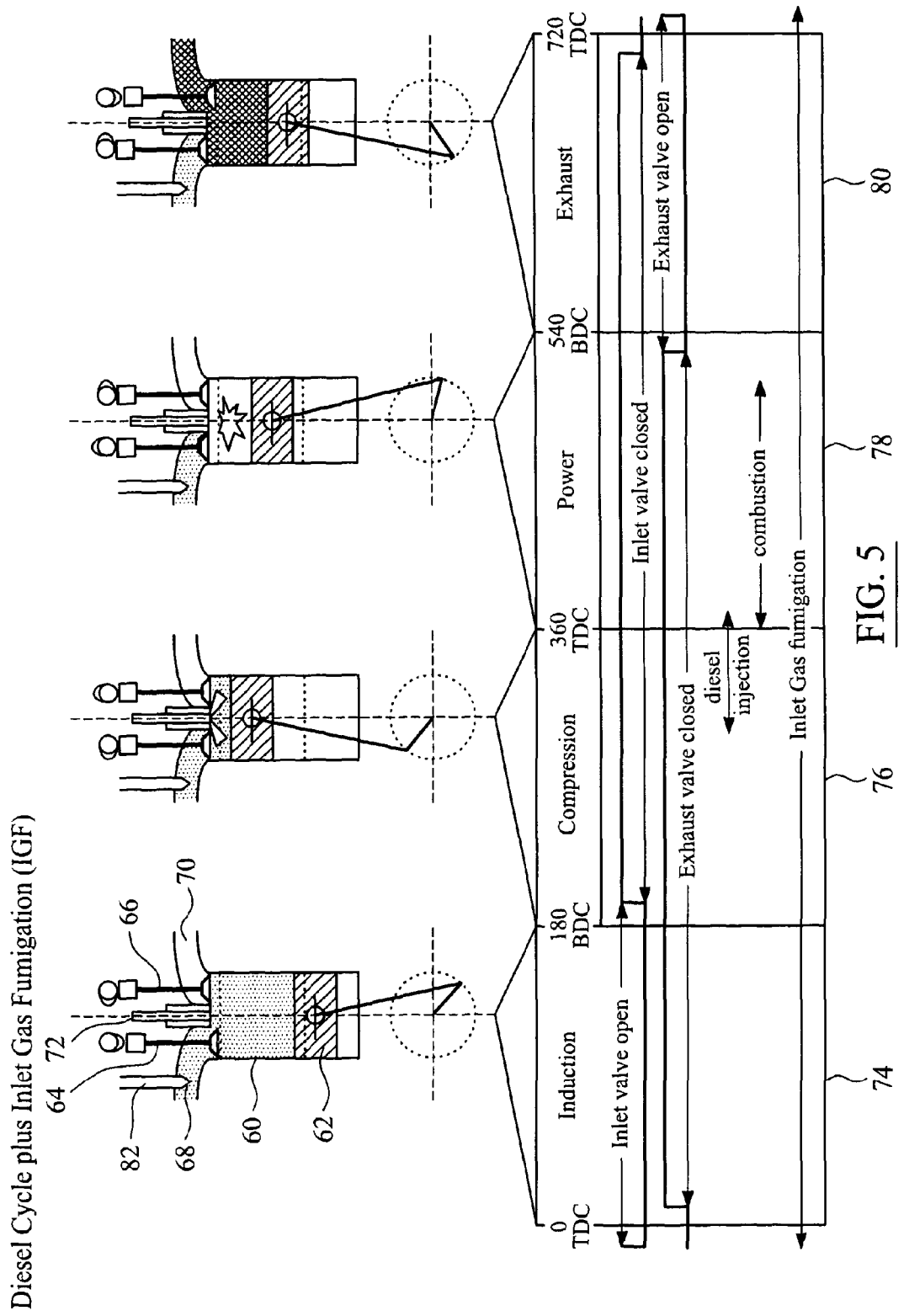
FIG. 5 is a timing diagram showing the combustion cycle of a combined gas/diesel engine according to a first embodiment of the present invention.
Figure 6:
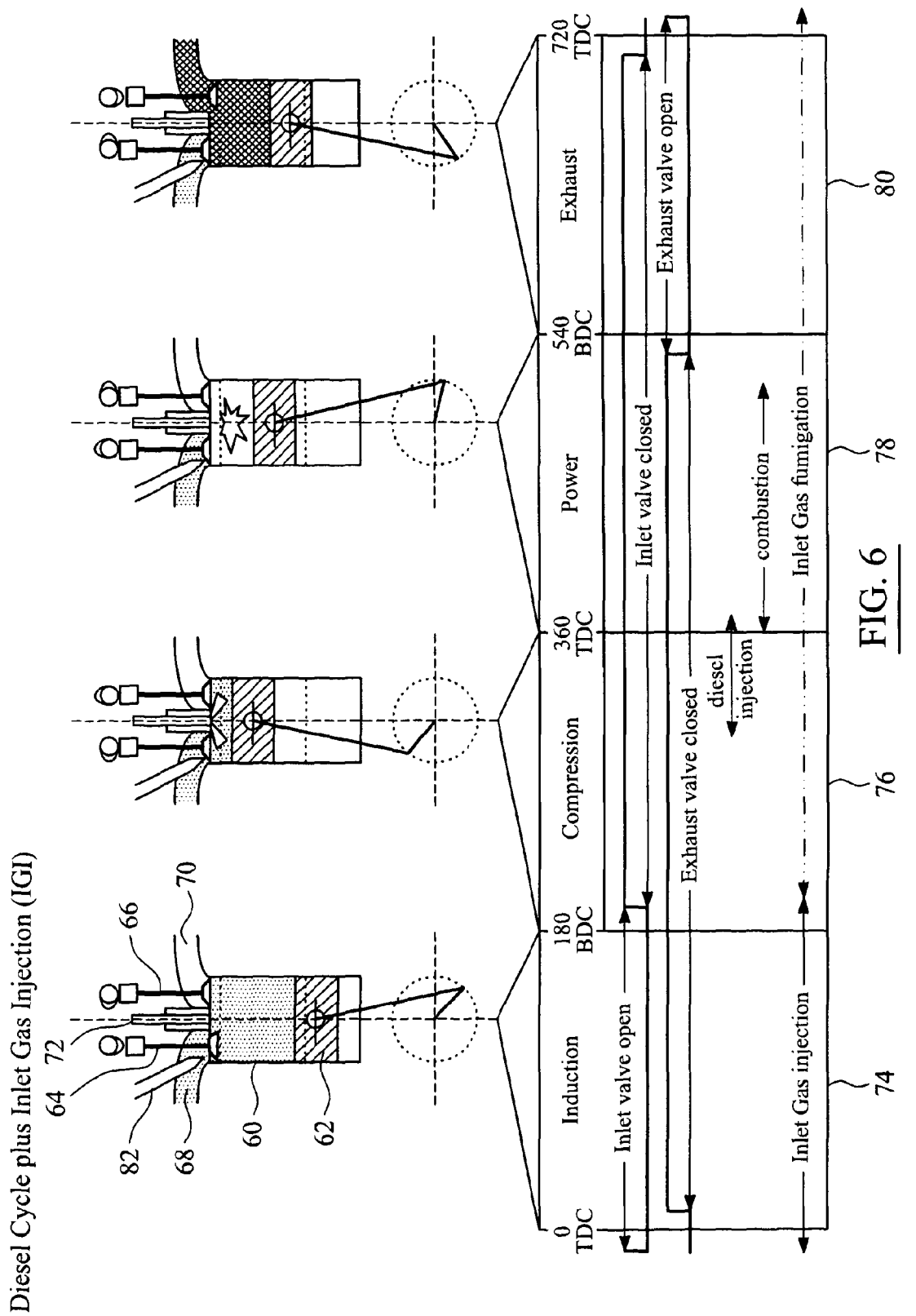
FIG. 6 is a timing diagram showing the combustion cycle of a combined gas/diesel engine according to a second embodiment of the present invention.

FIGS. 4 to 6 are schematic timing diagrams which illustrate the points in the four stroke cycle at which fuel and air are introduced into one cylinder. Only one cylinder is shown for simplicity.

Taking FIG. 4 first, this diagram shows the combustion cycle for a diesel only engine. The cylinder is represented schematically at the top of the diagram by the reference numeral 60. Piston 62 reciprocates in the cylinder 60 and the cylinder has inlet 64 and exhaust 66 valves for allowing air in through an inlet manifold branch 68 and expelling exhaust gases through an outlet manifold branch 70, respectively, as well as a diesel injector 72 arranged to spray diesel into the cylinder at an upper region.

The four stroke cycle is depicted by the timelines at the bottom of the diagram which are divided into four sections: Induction 74, Compression 76, Power 78 and Exhaust 80.

The inlet valve 64 is already open slightly before the Induction stroke 74 begins at 0 degrees and air is drawn into the cylinder. The exhaust valve 66 closes momentarily afterwards and remains closed until shortly before the Power stroke ends 78. The Compression stroke 76 begins at 180 degrees and soon thereafter the inlet valve 64 closes. Towards the end of the Compression stroke the diesel fuel is injected by the injector 72 and mixes with the air. At 360 degrees the power stoke begins 78 as the diesel fuel/air mixture ignites under pressure and the resulting rapid expansion of gases during combustion drives the piston 62. Shortly before the Power stoke 78 is finished the exhaust valve 66 opens and then the Exhaust stroke begins at 540 degrees. The exhaust valve 66 remains open until shortly after the Exhaust stroke ends (720 degrees) allowing the combustion products to be pushed out of the cylinder by the rising piston.

FIG. 5 shows the same cycle, with the same reference numerals representing the same elements as in FIG. 4, but with the difference that a gas injector 82 injects gas, as a secondary fuel, in the region of the inlet manifold 68 immediately upstream of the inlet valve 64 in accordance with a first embodiment of the present invention. As can be seen from the timing information at the bottom of the diagram the said region of the inlet manifold is fumigated—i.e. a charge of gas is deposited—continuously throughout the four strokes. The gas mixes with the air and is drawn into the cylinder when the inlet valve is open, from slightly before 0 degrees until slightly after 180 degrees.

In a second embodiment of the present invention, the gas supply nozzle is located closer to the inlet valve and is oriented towards the interior of the cylinder. In this embodiment, as well as fumigating the region of the inlet manifold outside the valve while the valve is closed, the gas supply nozzle is arranged to inject gas into the cylinder through the inlet valve 64 during the brief period when the valve 64 is open.

This arrangement allows a greater control of the mixing of the gas with the air. In particular, it ensures that a known quantity of gas is delivered precisely to where it needs to be to mix completely with the air.

FIG. 6 shows the same cycle as FIGS. 4 and 5, with the same reference numerals representing the same elements as in those figures, but with the difference that the gas injector 82 is directed towards the inlet valve 64 in accordance with the second embodiment of the present invention. The timing information at the bottom of the diagram illustrates that, for at least a part of the time that the inlet valve is open, the gas injector injects gas directly into the cylinder 60 at a region chosen for optimum mixing of the gas with the intake of air. After the inlet valve 64 closes, the gas injector continues to fumigate the region immediately upstream of the inlet valve during the rest of the cycle, which is unchanged.

In accordance with the embodiment described with reference to FIG. 6 both the quantity of gas available in the cylinder for mixing with air, and the location of the gas in the cylinder can be controlled more precisely.

As explained above, prior systems effected a reduction in diesel usage passively by making the OEM ECU believe that the fuel mixture was rich. However the inventors of the present invention have discovered that an active control of the primary fuel delivery system can provide a much greater economic benefit.

Even with the greater precision of gas delivery afforded by the present invention, as described above, for a given OEM ECU mapping—that is a predetermined algorithmically calculated performance characteristic—there will be a limit beyond which further reduction in the quantity of primary fuel which is delivered will not be allowed by the ECU.

This is because the ECU will have preset minimum fuel (i.e. diesel) levels for any given performance level of the engine, in accordance with a power curve—or a plot of brake horse power (bhp) against engine revolutions per minute (rpm). In other words, at a given rpm and bhp the ECU will have a preset minimum level of diesel which must be supplied regardless of what the lambda probe is telling the ECU about the oxygen content of the exhaust.

However, with the injection of secondary fuel, for a given amount of diesel a greater power is available. If an improvement in economy, rather than power, is sought then the power curve can be replicated with a combination of fuels—and in particular less diesel—but only if the preset limitations of the ECU can be overcome.

In order to do this the supply of diesel must be actively controlled independently of the ECU and the ECU must be prevented from detecting this.

Options for actively reducing the quantity of primary fuel injected during each cycle might include, but are not limited to: controlling the injection timing of the primary fuel and/or controlling its pressure, and/or controlling the throttle.

One particularly preferred method is to control the pressure of the diesel rail with a unit that alters the signal from the ECU which controls the diesel supply pressure, so as to reduce it, and which at the same time provides to the ECU an emulation signal which represents an expected sensed diesel pressure of an unaltered supply.

By actively controlling the supply of the primary (diesel) fuel it is possible to optimise the performance of the dual fuel engine for economy, and thereby significantly reduce the amount of diesel used.

FIGS. 7 and 8 are graphs of the power delivery of an engine with, and without, active control of the diesel supply.

FIG. 7 is a performance graph showing a so-called power curve of the dual fuel engine, without active reduction of diesel. The x-axis represents engine speed (rpm) and the y-axis represents power output (bhp). The horizontal broken line represents the peak power achievable for a diesel-only supply, while lines A, B and C respectively show the maximum power curve of diesel/gas mixture, the (OEM) diesel power curve of a diesel only supply, and the power contribution of the diesel in the combined-supply curve shown at A.

FIG. 8 shows the same power curve with the diesel being actively reduced. Line A shows the maximum power curve of the diesel/gas mixture which has been contrived by controlling the diesel pressure to match the OEM power curve (i.e. of line B in FIG. 8). Line B represents the suppressed diesel power curve—i.e. the power that would be achieved by the reduced level of diesel alone, and line C shows the power contribution of the diesel in the gas/diesel mixture required to match the OEM diesel only curve.

From a comparison of FIGS. 7 and 8 it can be seen that with active reduction of the primary fuel supply the diesel makes significantly less contribution to the delivered power—which still matches that of the original OEM mapping. This manifests itself as a significant reduction in diesel consumption.

Reducing the amount of primary fuel delivered to the engine can be achieved by;
reducing the control signal to the primary fuel injector;
reducing the demand signal to the OEM fuel management system.

The first method would require either the re-mapping of the OEM ECU to reduce injector rates (effectively de-rating the engine). This is not ideal for $3^{rd}$ party retrofit as it requires access to the OEM map. A similar effect could be achieved by introducing an electronic controller between the OEM ECU and the injectors. In this arrangement the unaltered signals are input to the controller, whereby they are modulated, in accordance with additional engine metrics (signals) to provide modified signals to the injector.

The other alternative is to modulate the demand (throttle) signal to the OEM fuel management system. This is the method used.

Most modern vehicles employ drive-by-wire throttle system, whereby the position of the throttle pedal is indicated as an electronic signal(s). These signals are conveyed to the OEM ECU, where in conjunction with other signals, they are used to control fuel delivery. Since the aim of the throttle is to control the engine, any modulation (change) in the electronic signals derived from the position sensor will have the same effect. To this end an electronic control unit (Throttle Position Sensor Unit, TPS Unit) was devised to accept the throttle position sensor signal and modify (attenuate) it. The modified (in terms of demand) signal was then presented to the OEM ECU in the same format as the throttle position sensor.

Dual Fuel Power and Torque Normalization Via the Throttle Position Sensor

The obvious method for modulating the amount and timing of diesel injected per diesel cycle is via the OEM ECU map. As may be expected, access to such maps is prohibited for 3$^{rd}$ Parties. The ultimate solution for gas delivery would be an "n" dimensional map, comprising baseline injector times, enrichment and de-richment strategies for both diesel only and dual fuelling, integrated in a single ECU. Such a scheme has been patented by BRISTOL GROUP.

An alternative approach is to modify the parameters associated with fuel delivery, the obvious parameter being the demand provided by the driver, i.e. throttle position. It has been stated that the decision to use the additional power (and consume greater fuel) is at the discretion of the driver. A scheme to attenuate the throttle demand signal, under diesel only fuelling would result in a drop in engine power. However this power deficit could be replaced by the additional power observed during dual fuelling.

The Throttle Position Sensor Unit

Figure 9:
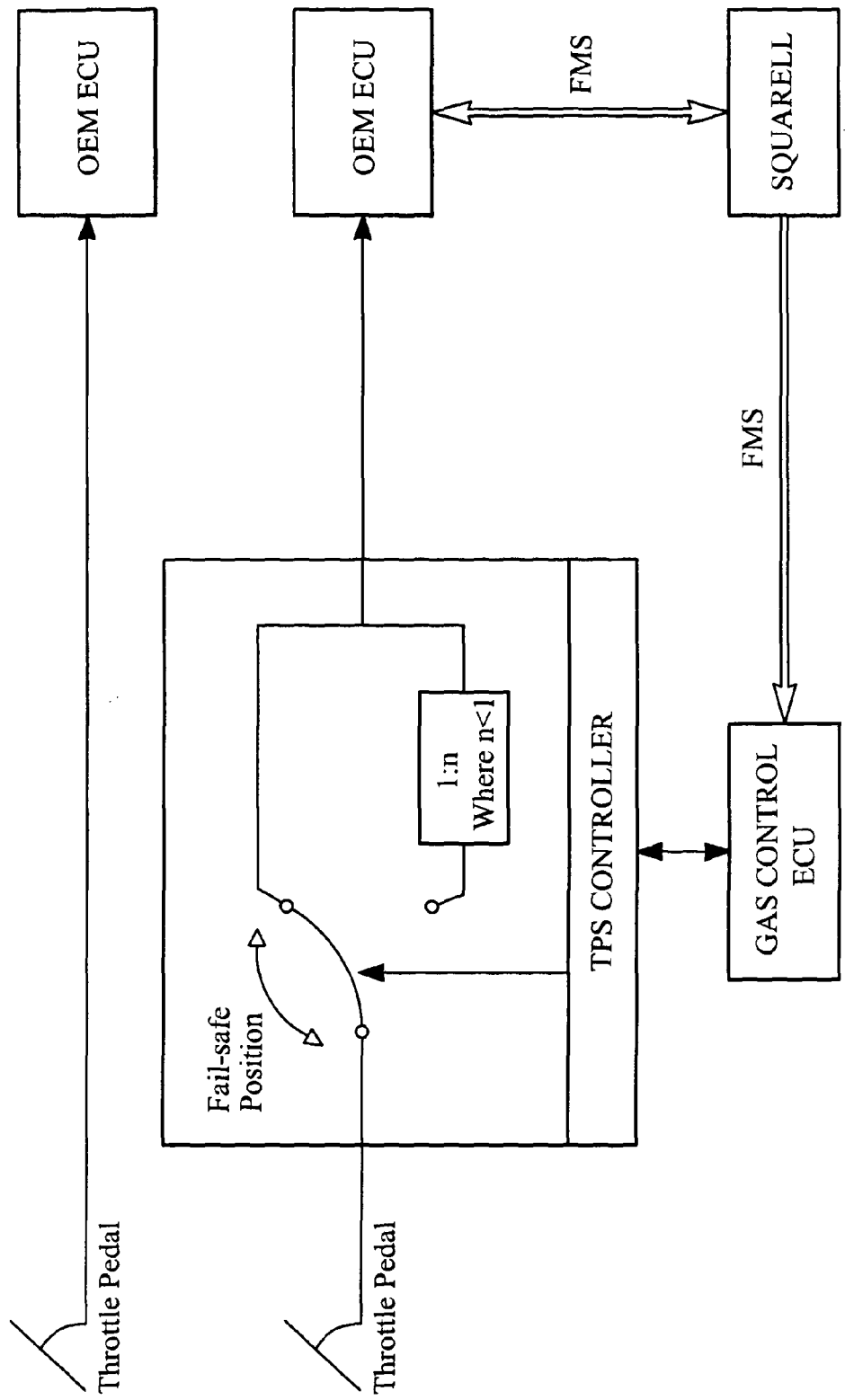
FIG. 9 shows schematically the operation of a throttle position sensor (TPS) in accordance with an embodiment of the present invention.

The operation of the TPS unit is shown in FIG. 9. The upper portion of FIG. 9 shows how demand signals are fed from the throttle pedal to the ECU. The lower portion shows how the TPS Unit is inserted into the throttle pedal signal path. In use, the TPS controller switches the throttle pedal demand signal into an attenuator, thus reducing the demand signal to the ECU.

The construction of the TPS is somewhat more involved than the simple diagram presented in FIG. 9. This is due to the following reasons:
1. The throttle pedal signals are usually differential pairs.
2. The differential signals can be analogue resulting in signals that
   a. Traverse different voltage levels
   b. Usually in anti-phase.
   c. Usually differentially scaled.
3. The differential signals can be digital in nature, being either
   a. Pulse width modulated at TTL levels.
   b. Pulse width modulated at arbitrary analogue levels.
4. A facility is required to auto-scale the various input signals in order to ensure maximum dynamic range of the sampling system.
5. A means is required for implementing and modifying transfer (attenuation) functions.
6. A fail safe method is required to "switch out" the TPS unit, thus reverting to a direct connection between the throttle pedal sensor and the OEM ECU.

Figure 10:
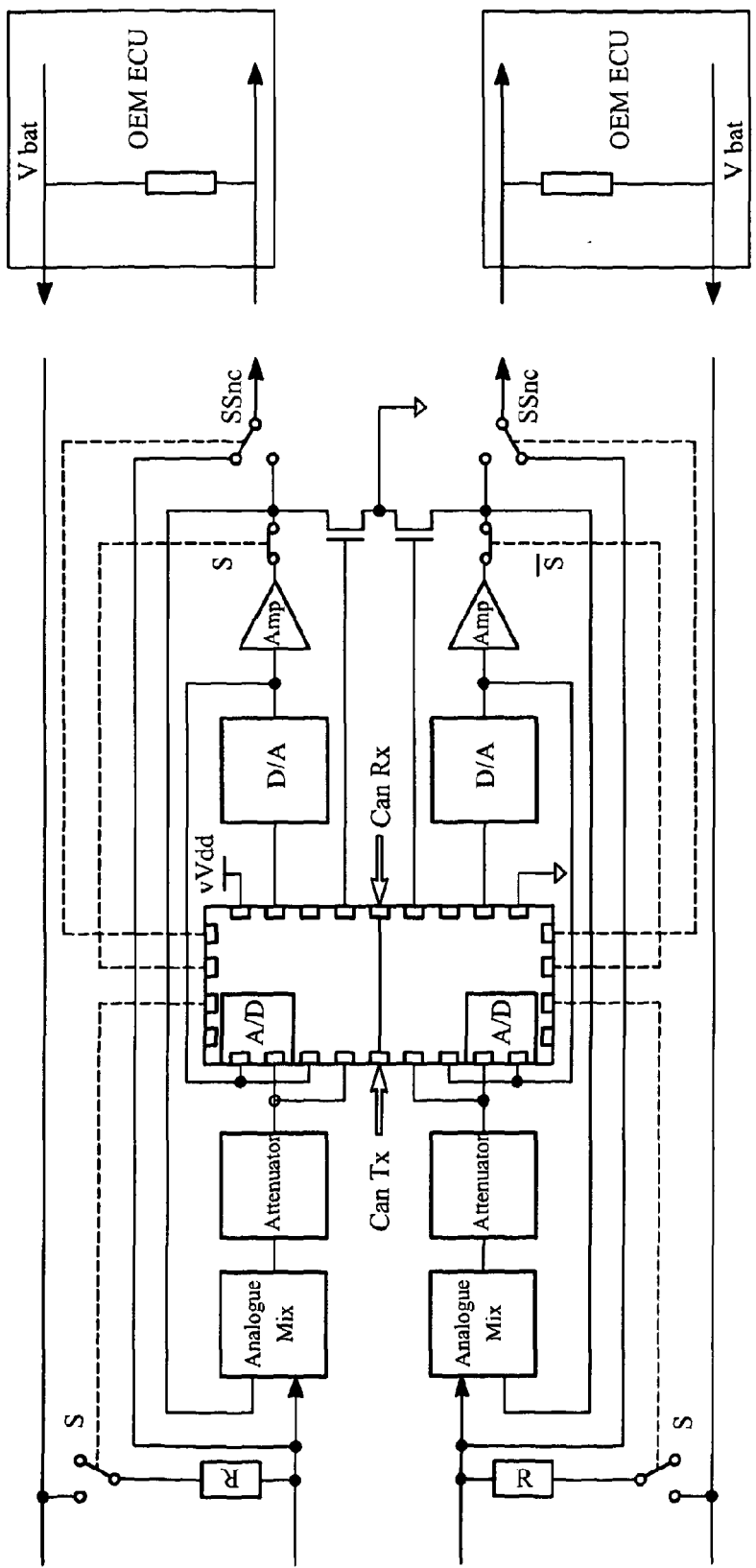
FIG. 10 shows in more detail a TPS architecture.

As such the TPS architecture is shown in FIG. 10.

As can be seen from FIG. 10, the TPS unit uses two mirror circuits to provide differential signals. A complicated arrangement of routing and control signals enables the system to sample data input and output data to ensure that the appropriate attenuation function has been loaded. This function is stored as an embedded look up table.

TPS Mapping

As previously described, the TPS Unit intercepts signals emanating from the throttle position sensor and scales these values before relaying them on to the OEM ECU.

The TPS unit provides an auto-scaling function which allows the throttle signal to be sampled when the throttle is fully depressed and released. This range is then divided into 100 quanta. Thereafter each quanta is presented with an associated scaling value between 0 and 1. Thereby the system can present non linear attenuation of the input throttle signal. This data is stored in memory as a lookup table, accessible via the IDS software and gas ECU.

In operation, a map must be constructed to achieve the desired TPS response. A selection of TPS map functions are shown in FIG. 11.

Figure 11:
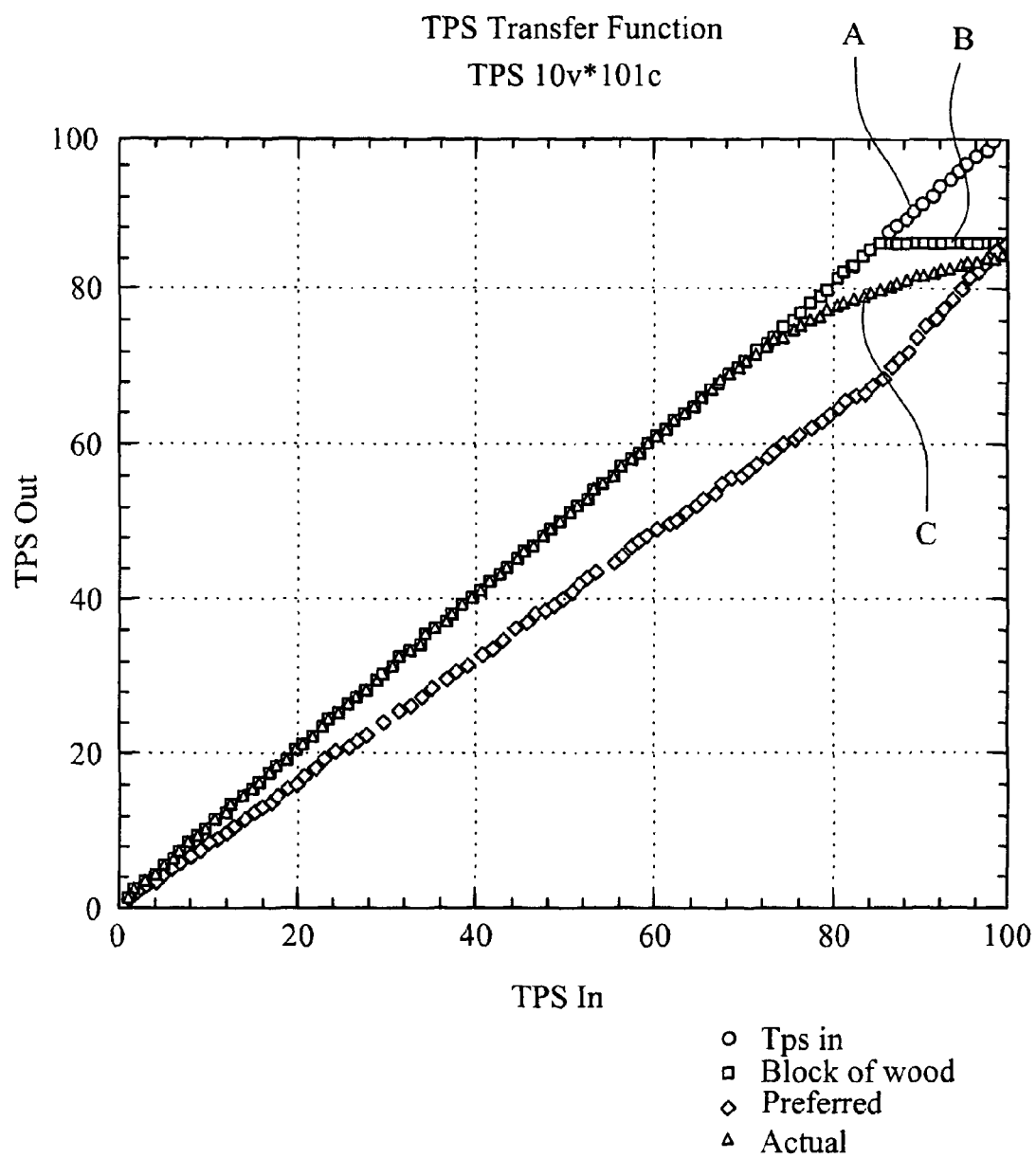
FIG. 11 shows TPS mapping.

There are four TPS maps shown in FIG. 11.

The first map is the 1:1 map; i.e. the output tps value equals the input tps value. This is shown by Trace A (partially obscured). Using this map allows the TPS Unit to pass unprocessed data from the throttle sensor to the OEM ECU. Using this map would result in no diesel economy.

The second map, Trace B follows the 1:1 trace A, i.e. the output signals equals the input signal until the throttle pedal reaches 85% of its full travel. Thereafter, providing the throttle position is greater than or equal to 85%, the TPS will signal 85% only to the OEM ECU. This function replicates placing a block of wood under the throttle pedal.

The third response Trace C is an improvement on the "block of wood" function, in that gradually reduces the diesel delivery after the throttle sensor as exceed 72% of full range. This was the function used in the TPS experimentation.

Clearly, diesel is only saved when the output is less than the input, the preferred function aims to decrease diesel delivery throughout the range of the throttle sensor, by reducing all values greater than 0%.

Whilst the above-described embodiments of the invention have been considered in relation to an after-market modification of an engine, in which an additional ECU is used in conjunction with the Original Equipment Manufacturer ECU, the skilled person will understand that the invention is also applicable to an OEM ECU designed from the outset to manage actively the consumption of primary fuel in order to achieve a predetermined power delivery with combined fuel.

Furthermore, whilst the above described examples of dual fuel relate to LPG and diesel, it will be understood by the skilled person that the primary fuel could be other than diesel and the secondary fuel could be other than LPG, without departing from the scope of the invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A dual fuel engine, said engine comprising:
   a diesel fuel supply for supplying diesel fuel via a diesel line to one or more engine cylinders;
   a secondary fuel supply for supplying a secondary duel to the one or more engine cylinders;
   the diesel and secondary fuels being arranged in use to mix with each other and with air for combustion in the one or more engine cylinders,
   an electronic controller for actively managing the supply of both the diesel and secondary fuels; and
   a unit arranged to alter a signal from the electronic controller which controls a diesel supply pressure so as to reduce it and control the pressure of the diesel line, the unit at the same time being arranged to provide an emulation signal to the electronic controller which represents an expected sensed diesel pressure of an unaltered diesel supply.

2. An engine according to claim 1 wherein the supply of the diesel and secondary fuels is arranged to be managed in accordance with a desired engine performance characteristic.

3. An engine according to claim 1 wherein the supply of both diesel and secondary fuels is arranged to be actively managed in accordance with a desired economy of performance of the engine.

4. An engine according to claim 1 wherein the supply of the diesel fuel is arranged to be actively reduced when a secondary fuel is supplied to the engine.

5. An engine according to claim 4 wherein the supply of diesel fuel to the engine is actively reduced by at least one selected from the group consisting of:
controlling the injection timing of the diesel fuel, and controlling throttle of the diesel fuel.

6. An engine according to claim 1 wherein the supply of the diesel fuel is arranged to be actively reduced when a secondary fuel comprising at least one selected from the group consisting of: liquid petroleum gas, compressed natural gas and liquefied natural gas is supplied to the engine.

7. An engine according to claim 1 wherein the electronic controller is, or is included in, a dedicated engine controlled unit for actively managing the supply of the diesel and secondary fuels.

8. An engine according to claim 7 wherein the dedicated engine controlled unit comprises an after-market fitted engine controlled unit.

9. An engine according to claim 7 wherein the active management of both the diesel and secondary fuels is undertaken by an original equipment manufactured engine controlled unit.

10. A method of improving the economy of a dual fuel engine having one or more engine cylinders and a secondary fuel supply for supplying a secondary fuel to the one or more engine cylinders, the method comprising the steps of:
actively managing supply of both a diesel fuel and the secondary fuel to the engine using an electronic controller; and
controlling the pressure of a diesel rail with a unit that alters the signal from the electronic controller which controls a diesel supply pressure so as to reduce it and which at the same time provides to the electronic controller an emulation signal which represents an expected sensed diesel pressure of an unaltered supply.

11. The method according to claim 10 further comprising the step of actively reducing supply of a diesel fuel when a secondary fuel is supplied.

12. The method according to claim 10 further comprising the step of actively reducing supply of the diesel fuel by at least one selected from the group consisting of: controlling injection timing of the diesel fuel, and controlling throttle of the diesel fuel.

13. A dual fuel engine, said engine comprising:
one or more engine cylinders;
a diesel fuel supply for supplying diesel fuel via a diesel line to the one or more engine cylinders;
a secondary fuel supply for supplying a secondary fuel to the one or more engine cylinders;
the diesel and secondary fuels being arranged in use to mix with each other and with air for combustion in one or more cylinders of the engine;
wherein both the diesel and secondary fuels are arranged to be injected into the one or more or each cylinder;
an electronic controller for actively managing the supply of both the diesel and secondary fuels; and
a unit arranged to alter a signal from the electronic controller which controls a diesel supply pressure to reduce it and control the pressure of a diesel line; the unit at the same time arranged to provide an emulation signal to the electronic controller which represents an expected sensed diesel pressure of an unaltered diesel supply.

14. An engine according to claim 13 wherein one of the diesel and secondary fuels is arranged to be injected in gaseous state into the cylinder through an open air inlet valve.

15. An engine according to claim 13 wherein the active management of both the diesel and secondary fuels is undertaken by an original equipment manufactured engine controlled unit.

16. An engine according to claim 13 comprising actively reducing supply of the diesel fuel by at least one selected from the group consisting of: controlling injection timing of the diesel fuel; controlling pressure of the primary fuel, and controlling throttle of the diesel fuel.

* * * * *